US008106761B2

(12) United States Patent
Luukkala et al.

(10) Patent No.: US 8,106,761 B2
(45) Date of Patent: Jan. 31, 2012

(54) APPARATUS, METHOD AND COMPUTER PROGRAM PRODUCT FOR PROVIDING A PERCEIVABLE PHYSICAL INDICATION OF SERVICE AVAILABILITY

(75) Inventors: Vesa-Veikko Luukkala, Espoo (FI); Samu-Pekka Samuel Kontinen, Helsinki (FI); Ian Justin Oliver, Söderkulla (FI); Jukka Honkola, Espoo (FI)

(73) Assignee: Nokia Corporation, Espoo (FI)

( * ) Notice: Subject to any disclaimer, the term of this patent is extended or adjusted under 35 U.S.C. 154(b) by 883 days.

(21) Appl. No.: 11/782,241

(22) Filed: Jul. 24, 2007

(65) Prior Publication Data

US 2009/0029699 A1 Jan. 29, 2009

(51) Int. Cl.
*G08B 23/00* (2006.01)
(52) U.S. Cl. ......................................... 340/500; 340/531
(58) Field of Classification Search .................. 340/500, 340/502, 503, 524, 531, 679; 455/435.1, 455/435.2; 709/202, 216; 235/375; 707/2
See application file for complete search history.

(56) References Cited

U.S. PATENT DOCUMENTS

| 5,454,448 A * | 10/1995 | Bittar et al. ..................... 187/395 |
| 6,577,239 B2 | 6/2003 | Jespersen |
| 6,956,480 B2 | 10/2005 | Jespersen |
| 6,975,993 B1 * | 12/2005 | Keiller ........................... 704/275 |
| 7,006,836 B2 * | 2/2006 | Yokoyama .................. 455/456.1 |
| 7,409,452 B2 * | 8/2008 | Ragnet et al. .................. 709/227 |
| 2007/0117510 A1 | 5/2007 | Elixmann |
| 2009/0049195 A1 * | 2/2009 | Ping Yang et al. ............. 709/244 |

FOREIGN PATENT DOCUMENTS

| EP | 125 1472 | 10/2002 |
| ES | 2 257 942 | 8/2006 |

OTHER PUBLICATIONS

Mikko Hurskainen, "Interconnect For Modular Device Architecture," Tampere University of Technology, Master's Thesis, Apr. 16, 2007, pp. 1-50.
Risto Suoranta, "New Directions in Mobile Device Architectures," Proceedings of the 9th Euromicro Conference on Digital System Design (DSD'06), 0-7695-2609-8/06, IEEE, pp. 1-7.

* cited by examiner

*Primary Examiner* — Toan N Pham
(74) *Attorney, Agent, or Firm* — Alston & Bird LLP (57) ABSTRACT

An apparatus, method and computer program product are provided for directing a device to emit a perceivable physical indication (e.g., noise, light, vibration, smell, etc.), in order to indicate to a user that the device provides a particular service of interest to the user. A user may request a list of the instances of a service (e.g., printer service, audio service, display service, etc.) available within a certain area. Upon receipt of the list of instances of a particular service, the user may select respective instances one by one such that the device on which each instance is executed emits a perceivable physical indication. This physical indication enables the user to determine where the device is located and how it is situated, information which the user can use to determine which device, or instance of the service, he or she should select.

36 Claims, 7 Drawing Sheets

APPARATUS, METHOD AND COMPUTER PROGRAM PRODUCT FOR PROVIDING A PERCEIVABLE PHYSICAL INDICATION OF SERVICE AVAILABILITY

FIELD

Embodiments of the invention relate, generally, to Service Oriented Architectures (SOAs) and, in particular, to a technique for facilitating a user's selection of a device within a SOA environment for providing a particular service based, for example, on the device's physical proximity and accessibility.

BACKGROUND

In a typical Service Oriented Architecture (SOA), it is possible to have multiple services, such as printing services, display services, music playback services, file storage services, networking services, and the like, collaborating in order to produce a single operation service that can be used via a device, mobile or otherwise (e.g., a cellular telephone, personal digital assistant (PDA), personal computer (PC), laptop, pager, etc.). For example, a room or building may have several speakers (e.g., television, stereo and/or PC speakers) and several music sources (e.g., PC, MP3 player, cell phone, etc.) that could be operated in various combinations with one another in order to provide a music playback service (e.g., the cell phone may use the television speakers to output music). Examples of existing SOA technologies include Web Services (http://www.w3.org), Universal Plug and Play (UPnP) (http:/www.upnp.org), and the Network-on-Terminal Architecture (NoTA) proposed by a consortium of companies including Nokia. NoTA, which is a modular system level device architecture, provides a platform for implementing services and applications, wherein interconnect nodes provide access points by which the services and applications can communicate, as well as a means by which services can register themselves so that their features and functionality are globally available to other services and applications in the system.

Before a service can be used in one of the above, or similar, SOA environments, the service may first need to be discovered and then connected to. In order to be discovered, the service may need to actively register itself and then wait for connections. Currently, a user of a service (e.g., printer service, music playback service, etc.) may be required to query for the service and, in the case of more than one possible service provider, choose one of the service providers before beginning to use the selected service.

While services, as such, are entities that are not bound to any physical device, in many cases the nature of the service is such that it may necessarily be provided by a real world device. For instance, a printing service is expected to produce a hardcopy, a display service should somehow visualize the image, and a keyboard service should let the user type the keys. In addition, it may be that a single device provides multiple services (e.g., a PC that provides file storage service, display service, and networking service), or that a service is provided by multiple devices (e.g., an office building having several printers that can be used for printing services). In general, services are ultimately provided by a device through potentially many levels of indirection, such as service collaboration, software components and the like.

When looking for a particular service in a SOA-like system, such as UPnP, Web Services or NoTA, the user may be faced with a choice of selecting the service, for instance a particular printer service offered from a list of many printer devices. In order to make a reasonable choice the user ideally should either have knowledge that any service is good enough or use some user-specific criteria for selecting the service. For example in case of printers, a printer that is physically near is likely better than another printer in a different building. For services that inherently require hands on operation, like a keyboard service and a display service, the criteria of physical accessibility and proximity (e.g., which way is the display projecting its image) are even more crucial.

It may be that the naming of the services offers some kind of indication of their physical accessibility and proximity, and it may be possible to provide more data for the user about the service at discovery phase, though this may not be feasible to do accurately enough for all services. For example, it may be easy to add information about the room or floor where a printer resides in an office building, but for a keyboard, loudspeaker or display the relevant information may be much harder to produce and keep up to date, since a wireless keyboard may be moved around and displays and loudspeakers are directional to a degree. On the other hand, this kind of meta-information may be very easy for a human to see at a glance.

A need, therefore, exists for a way to identify the devices that are providing a service or services in a manner that is easily perceivable by a human and that allows the human to identify the most suitable alternative based, for example, on physical proximity and accessibility.

BRIEF SUMMARY

In general, embodiments of the present invention provide an improvement by, among other things, providing a technique for physically identifying one or more instances of a service available to a user, such that the user can determine which of the available instances best meets his or her needs and preferences based, for example, on the corresponding devices' physical proximity and accessibility. According to various embodiments, an apparatus, method and computer program product are provided for directing a device to emit a perceivable physical indication, such as sounding a noise, flashing a light, vibrating, or emitting a smell or taste, in order to indicate to a user that the device provides a particular service of interest to the user. The indication may be triggered by a user seeking to select between various instances of a particular service.

In one embodiment, the user may first request a list of the instances of one or more services available within a certain area (e.g., an office building). For example, the user may request a list of all available "audio services," provided, for example, by television, stereo, public access (PA) or PC loudspeakers. Upon receipt of the list of instances of a particular service, the user may select respective instances one by one in order to request that the device on which each instance is executed emit a perceivable physical indication. The physical indication allows the user to readily determine where the device is located and how it is situated. The user can then use this information to determine which device, or instance of the service, he or she should select. For example, the user may select the PA loudspeakers over the television loudspeakers for providing an audio service, because the PA loudspeakers are larger/more powerful and/or more centrally located within a room—all criteria which would likely be difficult to use in selecting a device/service instance without first viewing or perceiving the physical device (i.e., criteria inherent in the physical realm of the device but not available digitally).

In accordance with one aspect, an apparatus is provided for providing a perceivable physical indication of service availability. In one embodiment, the apparatus may include a processor that is configured to: (1) receive a request to physically identify a device providing a service; and (2) transmit an instruction to the device, wherein the instruction causes the device to emit a perceivable physical indication.

In one embodiment the processor of the apparatus may further be configured to receive a request to identify one or more instances of a service and to identify one or more instances of the service requested. The processor may further be configured to transmit an identification associated with respective instances of the service identified, such that the request received to physically identify a device providing a service is a request to physically identify a device on which at least one instance of the service identified is executed.

In accordance with another aspect, a method is provided for providing a perceivable physical indication of service availability. In one embodiment, the method may include: (1) receiving a request to physically identify a device providing a service; and (2) transmitting an instruction to the device, wherein the instruction causes the device to emit a perceivable physical indication.

According to yet another aspect, a computer program product is provided for providing a perceivable physical indication of service availability. The computer program product contains at least one computer-readable storage medium having computer-readable program code portions stored therein. The computer-readable program code portions of one embodiment may include: (1) a first executable portion for receiving a request to physically identify a device providing a service; and (2) a second executable portion for transmitting an instruction to the device, wherein the instruction causes the device to emit a perceivable physical indication.

According to another aspect, an apparatus is provided for providing a perceivable physical indication of service availability. In one embodiment, the apparatus may include: (1) means for receiving a request to physically identify a device providing a service; and (2) means for transmitting an instruction to the device, wherein the instruction causes the device to emit a perceivable physical indication.

In accordance with another aspect, an apparatus is provided for requesting a perceivable physical indication of service availability. In one embodiment, the apparatus may include a processor that is configured to: (1) transmit a request to identify one or more instances of a service; (2) receive an identification associated with respective instances of the service identified; and (3) transmit a request to physically identify a device on which at least one instance of the service identified is executed, such that in response to the request the device emits a perceivable physical indication.

According to another aspect, method is provided for requesting a perceivable physical indication of service availability. In one embodiment, the method may include: (1) transmitting a request to identify one or more instances of a service; (2) receiving an identification associated with respective instances of the service identified; and (3) transmitting a request to physically identify a device on which at least one instance of the service identified is executed, such that in response to the request the device emits a perceivable physical indication.

According to yet another aspect, a computer program product is provided for requesting a perceivable physical indication of service availability. The computer program product contains at least one computer-readable storage medium having computer-readable program code portions stored therein. The computer-readable program code portions of one embodiment include: (1) a first executable portion for transmitting a request to identify one or more instances of a service; (2) a second executable portion for receiving an identification associated with respective instances of the service identified; and (3) a third executable portion for transmitting a request to physically identify a device on which at least one instance of the service identified is executed, such that in response to the request the device emits a perceivable physical indication.

According to another aspect, an apparatus is provided for requesting a perceivable physical indication of service availability. In one embodiment, the apparatus may include: (1) means for transmitting a request to identify one or more instances of a service; (2) means for receiving an identification associated with respective instances of the service identified; and (3) means for transmitting a request to physically identify a device on which at least one instance of the service identified is executed, such that in response to the request the device emits a perceivable physical indication.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview:

In general, embodiments of the present invention provide an apparatus, method and computer program product for directing a device to emit a perceivable physical indication, such as sounding a noise, flashing a light, vibrating, emitting a smell or taste, emitting warmth or heat, or directing a device to start its function, in order to indicate to a user that the device provides a particular service of interest to the user. In one embodiment, the indication may be triggered by the user who is attempting to select between one or more devices offering the same service. According to one embodiment, a user may request a list of instances or implementations of one or more services available within a certain area. The user may request a list of the instances of all or some of the available services (e.g., a list of all of the printing, display, music/video playback, loudspeaker, microphone still/video camera, lighting, heating, cooling, access control, domestic appliance, file storage, network, etc. services available to the user within a certain area), or he or she may request only the instances of a specific service, such as a printing service or a display service. In response to the request, the user may receive a list of the one or more instances of the service or services. For example, the list may indicate that the building has four printers, each of which provides an instance of a printing service, two projectors, each of which provides an instance of a display service, and a television, which provides an instance of a display service and an instance of an audio service.

Upon reviewing the list, the user may select one or more instances of a service, for which he or she would like a physical identification of the device providing that instance of the service. In other words, the user may indicate for which instances of a particular service he or she would like the device(s) providing that instance of the service to emit a perceivable physical indication, such that the user can quickly and easily gauge the physical proximity and accessibility of that device. The user can then use this information to select which device meets his or her purposes and preferences. In one embodiment, the user may manually select (e.g., by selecting a button, using a mouse to click on the instance within a displayed list, etc.) each instance of the service one by one in order to individually perceive the physical indication of each device. Alternatively, the user may ask that all or some of the devices providing an instance of the requested service simultaneously emit the physical indication, so that the user can compare the devices all at once. Alternatively, the user may ask that all or some of the devices providing an instance of the requested service emit the physical indication in sequence, so that the user can compare the devices one by one. In yet another embodiment, the devices may emit the physical indication automatically upon the user merely requesting the list of available services.

To illustrate, the following describes a scenario in which a user is selecting between multiple projectors or displays, and loudspeakers within a meeting room. In this scenario, the user may enter the meeting room with her mobile device 10 (see FIG. 2B), such as a cell phone, personal digital assistant (PDA), mobile communication device, laptop, audio/video player, mobile TV, still/video camera, positioning device (e.g., a Global Positioning System (GPS) device), and the like, or any combination of the aforementioned devices, with an intention of showing a presentation that is stored in his or her device. In this example, the room may have two projectors pointing in different directions and a regular personal computer (PC) display that each offers a "display service," as well as room PA and PC speakers which offer "audio service." For a presentation the user may query both display and audio services and receive a list of the above services. In one embodiment, the user may have already established a profile that contains the information that a "presentation" requires "display" and "audio" services. In this instance, the user may simply indicate that he or she requires presentation services, and a query of all or some of the display and audio services may be performed. Alternatively, the user may query for all or some of the possible services and then decide to choose, for example, a "dimming service" in addition to the previous services, in order to enhance the presentation experience. In general, and in one embodiment, the user may establish a profile, notice, request or calendar entry that contains information and one or more actions that are desired.

Upon receipt of the list of service instances or implementations, the user may then select the display services one by one so that the devices on which those services are operated emit, one by one, a perceivable physical indication, such as a beep and/or a flashing light. Upon hearing the device beeping and/or seeing the device flash its light, the user may pick the device (i.e., one of the projectors or the PC) that points to the most convenient direction and also offers an easily accessible, non-wireless connection to save battery. The user may then select the audio service by similar mechanism. In one embodiment, part of the selection process may be automated. For instance the room itself may offer several different "presentation services" with different combinations of display and audio services. In this embodiment, selecting one of these aggregate services would then identify the component devices.

In another scenario, the user may be selecting a keyboard and display within an office. In this scenario, the user may arrive at the office with his or her mobile device with the aim of typing a message. This office is not the user's home office, but rather is a visitor space with a few public devices. For composing a message he or she may prefer a large display and a full-sized keyboard. By querying "keyboard" and "display" services, the user may receive a list of available devices. In one embodiment, the list may further indicate whether someone else is already using those services or devices. As in the above scenario, the user can then select instances of the keyboard and/or display services from the list, for which the user would like a physical identification of the devices providing the service. As the user selects the instance and the corresponding device emits the perceivable physical indication (e.g., it beeps or flashes a light), the user can select the devices that seem to be the most suitable ones for her purpose and preferences.

Using embodiments of the invention, therefore, a user is able to determine not only which services, and corresponding devices, are available to the user, but also which of the available service instances (e.g., which of several devices offering the same service) is best suited for the user based, for example, on the corresponding device's physical proximity and accessibility.

Figure 1:
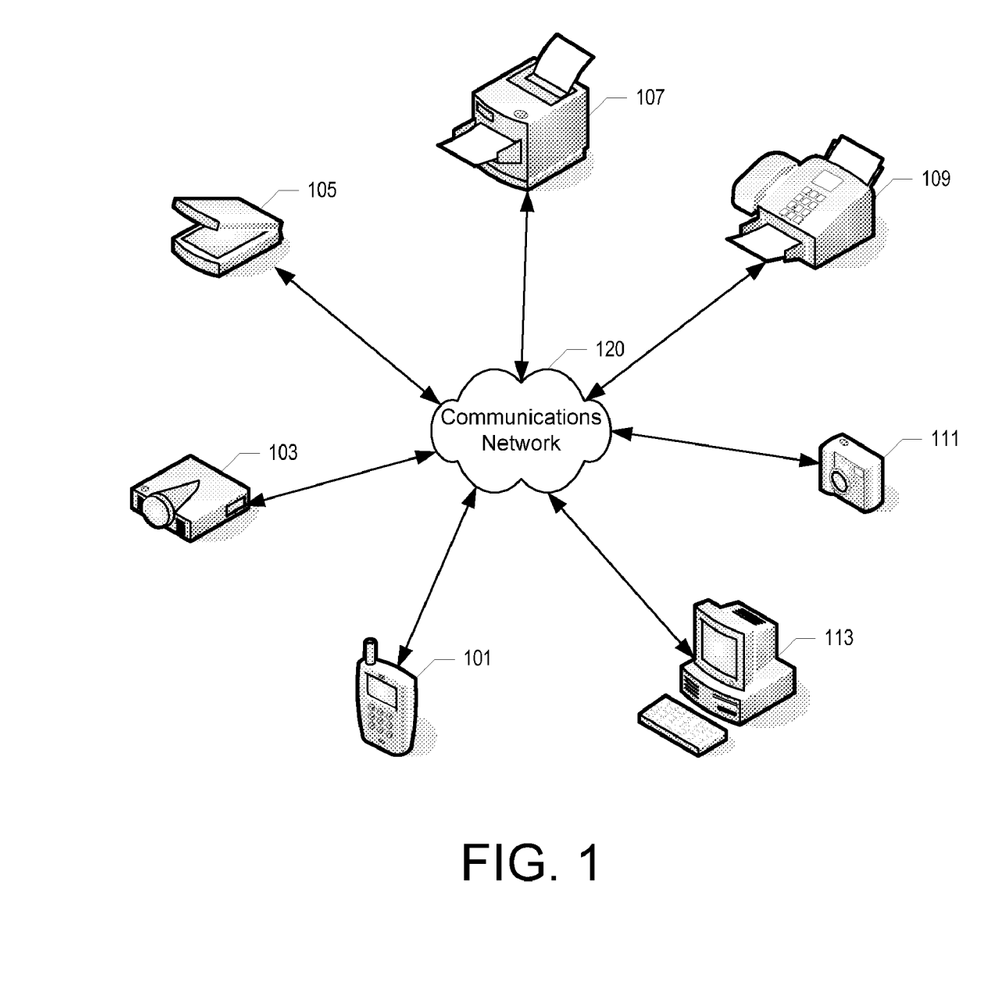
FIG. 1 is a block diagram of one type of system that would benefit from embodiments of the present invention.

Overall System and Mobile Device:

As discussed above, embodiments of the present invention may be implemented within various Service Oriented Architecture (SOA) environments, wherein multiple services may be provided by various combinations of different devices. Examples of these environments may include Web Services, Universal Plug and Play (UPnP) and Network on Terminal Architecture (NoTA), to name a few. Referring to FIG. 1, an illustration of one type of SOA environment that would benefit from embodiments of the present invention is provided. As shown, the system or environment may include any number and combination of devices including, for example, mobile devices 101 (e.g., cell phones, mobile communication devices, PDAs, PCs, laptops, pagers, etc.), digital projectors 103, scanners 105, printers 107, fax machines 109, digital cameras and camcorders 111, PCs 113, televisions (not shown), loudspeakers (not shown), microphones (not shown), web cameras (not shown), other multimedia capturing, producing and/or storing devices, as well as lighting, heating, cooling and/or access control devices (not shown), Closed Circuit Television (CCTV) systems (not shown), domestic appliances (not shown), sensor devices (not shown), and the like. Each device may comprise means, including hardware, software or a combination thereof, for providing one or more services (e.g., printer services, display services, audio services, music playback services, file storage services, etc.) to the other devices within the SOA environment. In addition one or more services may be provided by a combination of two or more of the devices of the SOA environment (e.g., a presentation service may be provided by the combination of a projector and a PA loudspeaker, music playback service may be provided by the combination of an MP3 Player and a television speaker, etc.).

As discussed in more detail below with regard to FIGS. 3 and 5, in order to provide these services, each device may comprise independently operating subsystems associated with respective services. In addition, as is also discussed in more detail below with regard to FIGS. 4A, 4B and 6, each SOA environment may comprise a registry or resource manager configured to maintain information associated with the services available within the SOA environment. The registry may be maintained by or executed on any one of the devices within the SOA environment and may be implemented using various means including various hardware or software components, or combinations thereof.

The devices of the SOA environment may be in communication with one another over any wired or wireless communication network 120 (e.g., wired or wireless Local Area Network (LAN) or Personal Area Network (PAN), or a short range wireless communication network). As such, the devices 101, 103, 105, 107, 109, 111 and 113 may communicate with one another in accordance with, for example, radio frequency (RF), Bluetooth (BT), infrared (IrDA) or any of a number of different wireline or wireless communication techniques, including LAN and/or Wireless LAN (WLAN) techniques. As is discussed in more detail below where, for example, the SOA technology is NoTA, the services provided by the devices may communicate with one another via what is referred to as a High Interconnect (H_IN) Interface.

Figure 2A:
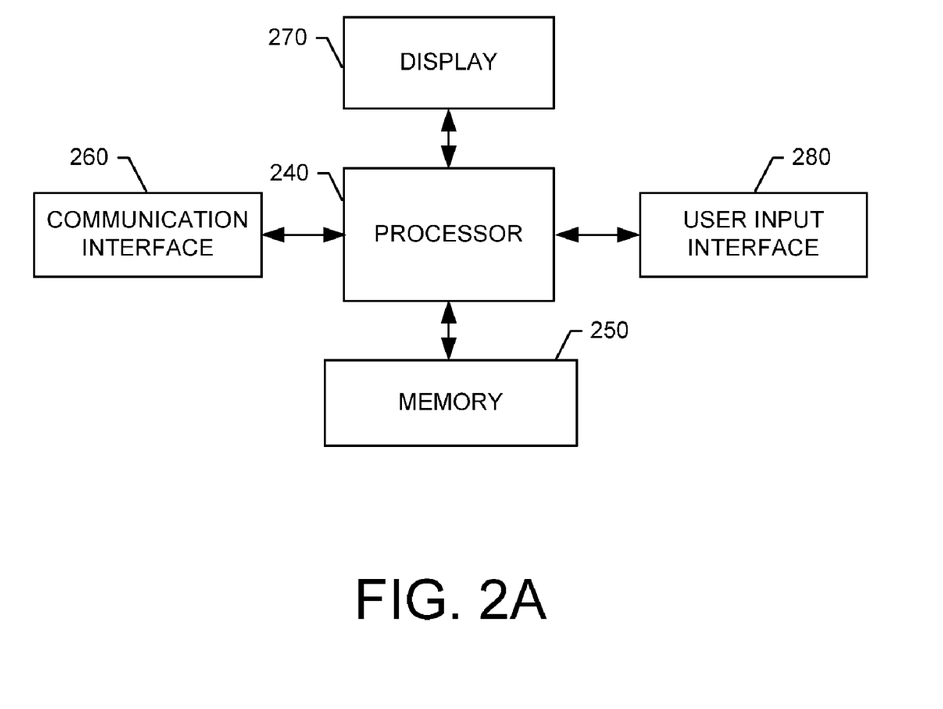
FIG. 2A is a schematic block diagram of an entity capable of operating as a device within an SOA environment in accordance with embodiments of the present invention.
Figure 2B:
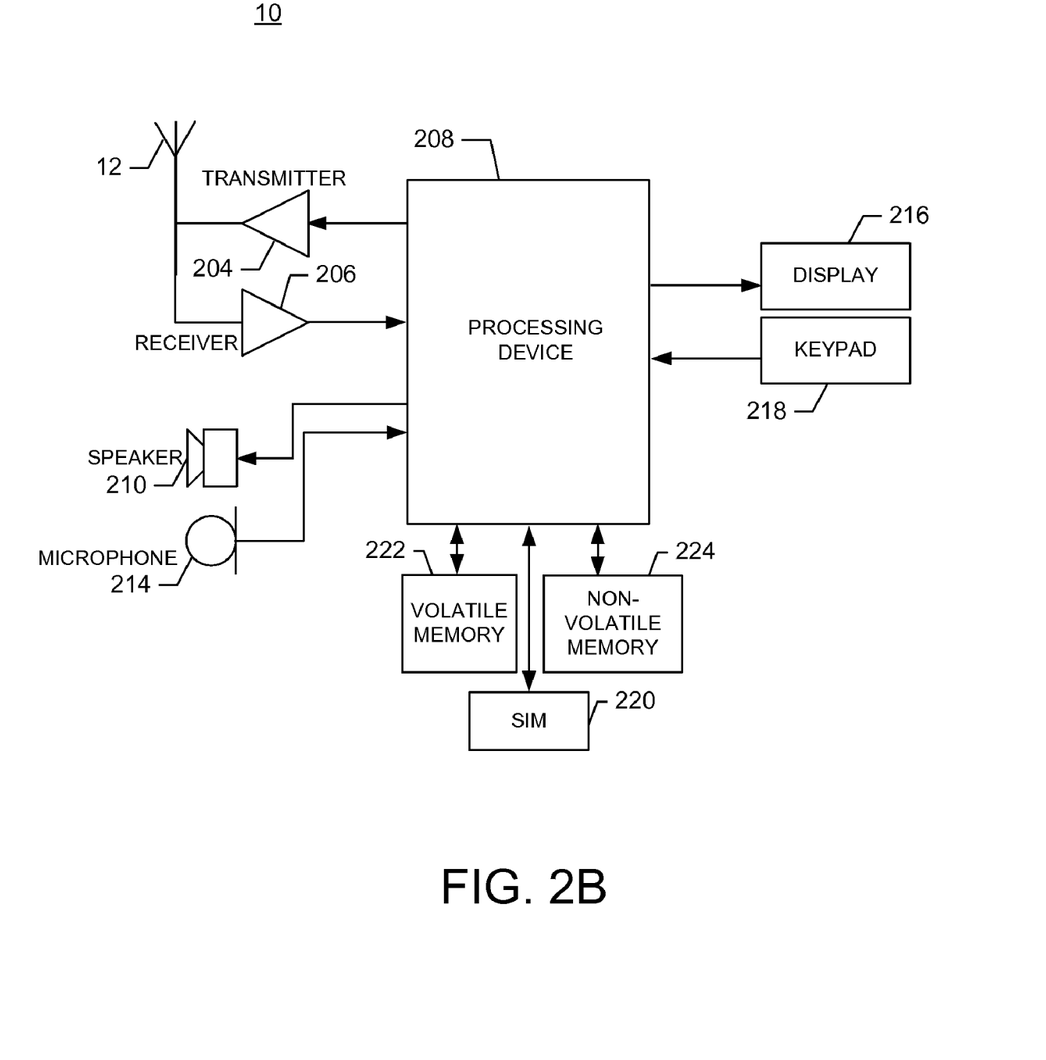
FIG. 2B is a schematic block diagram of a mobile station capable of operating in accordance with an embodiment of the present invention.

Reference is now made to FIGS. 2A and 2B, which provide block diagrams of electronic devices that could be operating in the system of FIG. 1 as either a device providing a service or a device querying for available services. FIGS. 3 and 5 provide additional block diagrams of an electronic device in accordance with two embodiments of the invention. These figures will be discussed in detail below.

Referring to FIG. 2A, as shown a device operating within the SOA environment may include various means for performing one or more functions in accordance with embodiments of the present invention, including those more particularly shown and described herein. It should be understood, however, that one or more of the entities may include alternative means for performing one or more like functions, without departing from the spirit and scope of the present invention.

As shown, a device within the SOA environment can generally include means, such as a processor 240 for performing or controlling the various functions of the entity. For example, in one embodiment, the processor, or other means, may be configured to perform the functionality of the registry or resource manager discussed throughout. In this embodiment, the processor may be configured to receive a request to identify one or more instances of a service available within the SOA and to transmit the identification associated with respective instances of the service identified. The processor may further be configured receive a request to then physically identify a device on which at least one instance of the service identified is executed and, in response, transmit an instruction to the device to emit a perceivable physical indication.

In one embodiment, the processor is in communication with or includes memory 250, such as volatile and/or non-volatile memory that stores content, data or the like. For example, the memory 250 typically stores content transmitted from, and/or received by, the entity. Also for example, the memory 250 typically stores software applications, instructions or the like for the processor to perform steps associated with operation of the entity in accordance with embodiments of the present invention.

In addition to the memory 250, the processor 240 can also be connected to at least one interface or other means for displaying, transmitting and/or receiving data, content or the like. In this regard, the interface(s) can include at least one communication interface 260 or other means for transmitting and/or receiving data, content or the like, as well as at least one user interface that can include a display 270 and/or a user input interface 280. The user input interface, in turn, can comprise any of a number of devices allowing the entity to receive data from a user, such as a keypad, a touch display, a joystick or other input device.

Reference is now made to FIG. 2B, which provides an example wherein the electronic device of embodiments operating within the SOA environment comprises a mobile device or station, such as cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with embodiments of the present invention, including those more particularly shown and described herein. It should be understood, however, that the mobile station may include alternative means for performing one or more like functions, without departing from the spirit and scope of the present invention. More particularly, for example, as shown in FIG. 2B, in addition to an antenna 12, the mobile station 10 includes a transmitter 204, a receiver 206, and means, such as a processing device 208, e.g., a processor, controller or the like, that provides signals to and receives signals from the transmitter 204 and receiver 206, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-FiR), IEEE 802.16 WiMAX, ultra wideband (UWB), and the like.

It is understood that the processing device 208, such as a processor, controller or other computing device, may include the circuitry required for implementing the video, audio, and logic functions of the mobile station and may be capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 208 thus also includes the functionality to convolutionally encode and interleave message and data prior to modulation and transmission. The processing device can additionally include an internal voice coder (VC) 208A, and may include an internal data modem (DM) 208B. Further, the processing device 208 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 210, a ringer 212, a microphone 214, a display 216, all of which are coupled to the controller 208. The user input interface, which allows the mobile device to receive data, can comprise any of a number of devices allowing the mobile device to receive data, such as a keypad 218, a touch display (not shown), a microphone 214, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 220, a removable user identity module (R-UIM) (not shown), or the like, which typically stores information elements related to a mobile subscriber. In addition to the SIM, the mobile device can include other memory. In this regard, the mobile station can include volatile memory 222, as well as other non-volatile memory 224, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device.

The memory can also store content. The memory may, for example, store computer program code for an application and other computer programs. For example, in one embodiment of the present invention, wherein the mobile station is used to query available services within a SOA environment, the memory may store computer program code for transmitting a request (e.g., to a registry or resource manager of the SOA environment) to identify one or more instances of a service available within the SOA environment. The memory may further store computer program code for receiving, in response, an identification associated with respective instances of the service identified (e.g., including a device identification associated with the devices executing the service), and transmitting a request to physically identify a device on which at least one instance of the service identified is executed (i.e., a request that the device emit a perceivable physical indication, such that the user can gauge the physical proximity and accessibility of the device). In another embodiment of the present invention, the mobile station may be a device within the SOA that provides the registry or resource management functionality discussed throughout. In this embodiment, the memory may store computer program code for receiving the request to identify one or more instances of a service available within the SOA and transmitting the identification associated with respective instances of the service identified. The memory may further store computer program code for receiving the request to physically identify a device on which at least one instance of the service identified is executed and, in response, transmitting an instruction to the device to emit a perceivable physical indication.

The apparatus, method and computer program product of embodiments of the present invention are primarily described in conjunction with mobile communications applications. It should be understood, however, that the apparatus, method and computer program product of embodiments of the present invention can be utilized in conjunction with a variety of other applications, both in the mobile communications industries and outside of the mobile communications industries. For example, the apparatus, method and computer program product of embodiments of the present invention can be utilized in conjunction with wireline and/or wireless network (e.g., Internet) applications.

Implementation within a NoTA Environment

The following describes one embodiment of the invention, in which the devices are operating within a NoTA environment. As discussed above, NoTA is a modular system level device architecture promulgated by a consortium of companies including Nokia. The overall purpose of NoTA is to provide a modular open architecture, whereby device components provided by virtually any manufacturer can fit together and share services and applications. This purpose is achieved primarily through the use of independent subsystems responsible for providing various services and capable of communicating directly with one another.

In general, each device within a NoTA environment comprises one or more subsystems, each having their own computing resources including all or some of the resources needed to provide a number of services that are the functionalities that the user desires from the overall device. As discussed above, examples of services may include display services, audio services, music playback services, image capture services, networking services, and the like. The subsystems within a device are connected to one another via a Low Interconnect (L_IN) Interface. A High Interconnect (H_IN) Interface provides a unified interface to the services within the subsystems, as well as service registration, discovery and access functionality. Each NoTA environment may include a registry, or resource manager, operating on any device within the NoTA environment and configured to manage access to the various services provided by the devices of the network. The resource manager may receive and maintain registration requests from each of the services implemented within the NoTA environment. These requests may provide identification and capability information associated with the various instances or implementations of the service.

Figure 3:
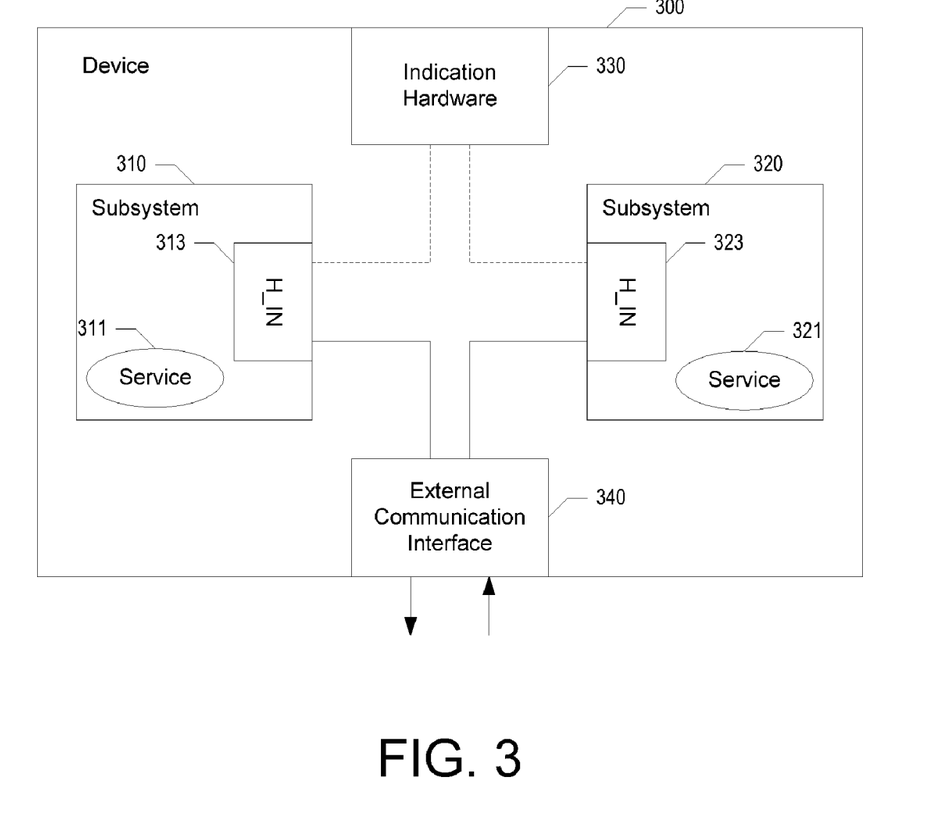
FIG. 3 is a schematic block diagram of a device operating within a NoTA environment in accordance with an embodiment of the present invention.

Reference is now made to FIG. 3, which provides a block diagram of a device operating in a NoTA environment in accordance with one embodiment of the present invention. As shown, the device 300 may include one or more subsystems 310, 320, each of which includes one or more services 311, 321 (i.e., the hardware and/or software required to implement a service, such as a music playback service, image capture service, etc.). Each subsystem 310, 320 within the device 300, and thereby each service 311, 321 within each subsystem, is connected to the other via the H_IN interface 313, 323. These subsystems 310, 320 and services 313, 323 are further connected to the subsystems and services provided by other devices within the NoTA environment via their respective H_IN interfaces 313, 323 and the external communication interface 340.

According to embodiments, the device 300 further includes indication hardware 330. This may include, for example, a light, a beeper, buzzer or other noise making apparatus, a speaker, a combination thereof, or any other hardware and/or software combination capable of outputting the perceivable physical indications discussed above. As shown, the subsystems 310, 320 of one embodiment may be configured to communicate with the indication hardware 330 via the H_IN interface 313, 323 (i.e., without any involvement of the specific service 311, 321 provided by the subsystem 310, 320).

Figure 4A:
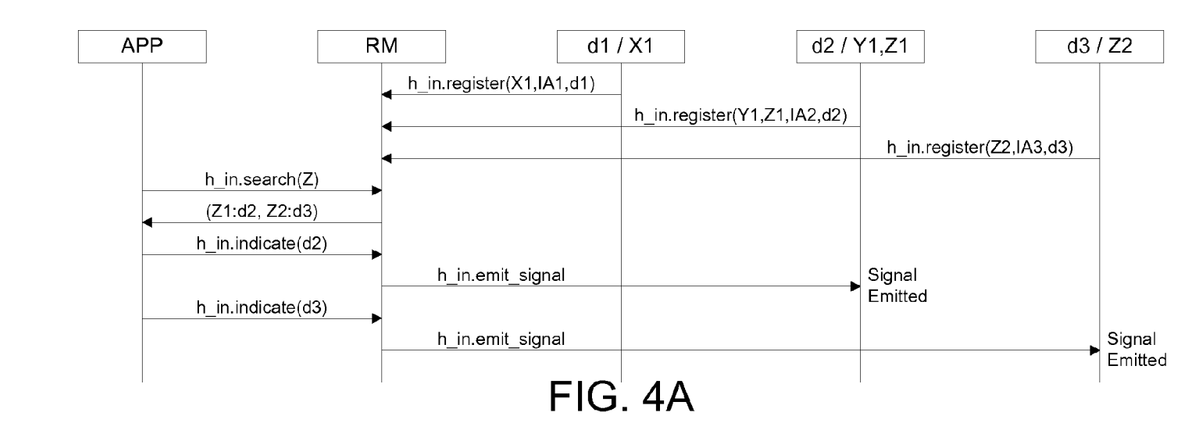
FIGS. 4A and 4B illustrate the process that may be taken in order to cause a device, such as that shown in FIG. 3, to emit a perceivable physical indication in accordance with embodiments of the present invention.
Figure 4B:
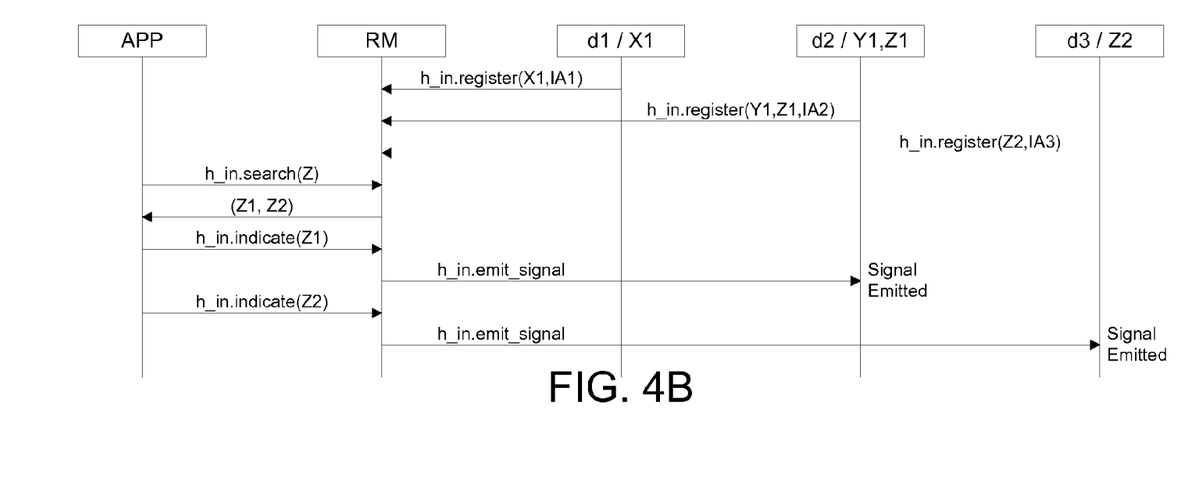
Figure 5:
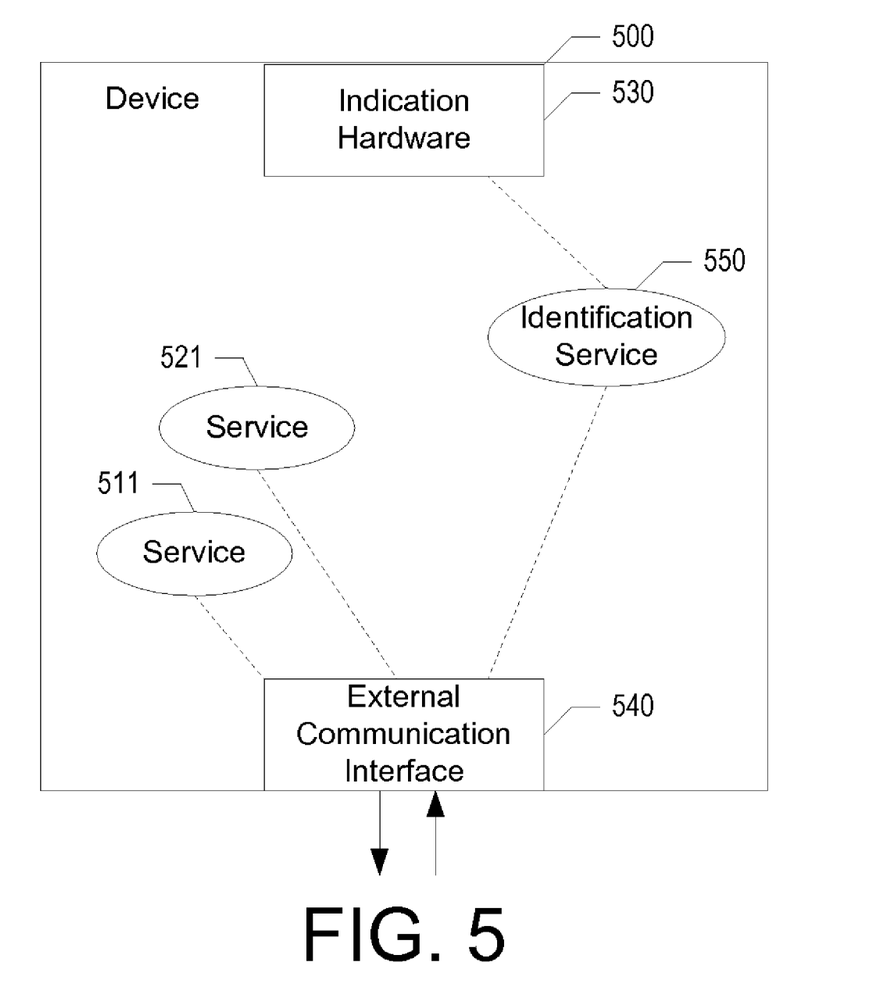
FIG. 5 is a schematic block diagram of another device operating in accordance with an embodiment of the present invention.

FIGS. 4A and 4B illustrate the operations that may be taken in order to cause devices, such as the device 300 of FIG. 3, to emit a perceivable physical indication in accordance with an embodiment of the present invention. In the embodiment shown in FIGS. 4A and 4B, three devices d1, d2, and d3 implementing three services X, Y and Z are included within the NoTA environment. The first device d1 provides a first instance or implementation of service X (i.e., X1). The second device d2 provides a first instance of services Y and Z (i.e., Y1, Z1), while the third device d3 provides a second instance of service Z (i.e., Z2). An application (APP) executed on an unspecified device, such as a mobile phone operated by a user entering the vicinity of the NoTA environment (e.g., to give a presentation using a projector and audio system provided in a visited office), desires to identify devices within the NoTA environment that provide an instance of service Z (e.g., a display and/or audio service).

As shown, the process may begin when each service instance or implementation on the devices registers itself with the H_IN resource manager (RM). This may be done, for example, using the h_in.register primitive of the NoTA service level H_IN protocol implementation. The first device d1 may send the signal h_in.register(X1,IA1,d1) to the resource manager, wherein X1 identifies the instance of service X provided by the first device d1, IA1 corresponds to the Interconnect Address unique to the NoTA subsystem of the first device d1 providing the instance of service X, and d1 is a device identifier associated with the first device. Similarly, the second device d2 may send the signal h_in.register(Y1, X1,IA2,d2) in order to identify the instances of services X and Y operating on the second device d2, as well as the Interconnect Address unique to the subsystem providing the service instances and the device identifier associated with the second device. Finally, the third device may likewise transmit the signal h_in.register(Z2,IA3,d3) to the resource manager in order to identify the service instance of service Z, the Interconnect Address of the subsystem and the device identifier. The resource manager may then store all or some of the information provided.

The application (APP) may then query the resource manager for instances of service Z by transmitting the signal h_in.search(Z) to the resource manager. In response, the resource manager and, more specifically, a processor or other means operating on one of the devices of the NoTA environment providing resource manager functionality, may transmit a list of the instances of service Z located within the NoTA environment along with the device identifier for each service instance or implementation item on the list (e.g., "(Z1:d2, Z2:d3)"). This list may be based on the registration information previously received by the resource manager.

At this point, the application may use an additional primitive added to the NoTA service level H_IN protocol in order to request that the resource manager provide a physical indication for each device identified in the list received. As noted above, in one embodiment, the user may individually and manually request a physical indication of each service instance from the list, such that the physical indications are generated one by one. As shown in FIG. 4A, the application may transmit the signal h_indicate(d2) to the resource manager in order to request that the resource manager instruct the second device d2 to emit some perceivable physical indication (e.g., a beep or a flashing light), so that the user can identify the device d2 in the physical realm. Likewise, the application may subsequently transmit the signal h_indicate (d3) to the resource manager in order to request that the resource manager instruct the third device d3 to similarly emit a physical indication. Alternatively, while not shown, the user may prefer to have all or some of the devices emit a physical indication at the same time so that the user can compare the devices available all at once. In this case, the user may transmit a signal, such as h_indicate(d2,d3), indicating that both devices should be instructed to emit the physical indication.

In response to any of the above requests, the resource manager may use the H_IN protocol to transmit a message to the H_IN interface executing at the given device (i.e., d2 or d3) instructing the device to actuate the indication hardware. The resource manager may transmit the signal h_in.emit_signal to the H_IN interface operating on the second and third devices, respectively. In response, the H_IN implementation at the target device may then act to produce the indication using the suitable hardware.

FIG. 4B differs from FIG. 4A only in that device identifiers are not exchanged between the various components during the process. The registration requests provided by the various service instances (i.e., h_in.register) do not include a device identifier associated with the device on which the service is executed. Similarly, the resource manager does not provide the application with the device identifiers associated with the requested service, and the application's request to provide the physical indication (i.e., h_in.indicate) includes the service instance identifier and not the device identifier. The embodiment of FIG. 4B, which is simpler than that of FIG. 4A, is possible in most instances, since the subsystems are physically located on the device having the indication hardware. The subsystems, therefore, do not need to know on what physical device they are located as long as they are directly connected to the indication hardware and can, therefore, generate the physical indication when requested.

To summarize, in the above-described embodiment, the service implementations X1, Y1, Z1 and Z2 may register themselves to the resource manager, with the device information optionally included in the registration message. An application (APP) (i.e., a program executed by a device operated by a user entering the NoTA environment) may then query the resource manager for implementations providing service Z. The resource manager may respond with a list of service implementations or instances and the devices on which they are running. The application may then request that the device running Z1 identify itself by sending an h_in.indicate(d2) message to the resource manager. The resource manager may order a H_IN implementation in the second device d2 to identify itself. The user may then select service implementation Z1, or a similar procedure may be performed for Z2 using h_in.indicate(d3). Once completed, the application may establish a H_IN connection with the selected service implementation.

As one of ordinary skill in the art will recognize, the foregoing description of one implementation of an embodiment of the invention in a NoTA environment is provided for exemplary purposes only and should not be taken in any way as limiting the scope of embodiments of the invention to use with respect to NoTA. In contrast, as indicated above, embodiments of the invention may be implemented in virtually any SOA environment wherein one or more services are provided by various combinations of devices communicating with one another.

Implementation using Identification Service

Another embodiment, in which an Identification Service operating on respective devices in a SOA environment may be used to cause the corresponding device to emit a perceivable physical indication, will now be discussed in relation to FIGS. 5 and 6. Referring to FIG. 5, a block diagram of a device in accordance with this embodiment is provided. As shown, the device 500 may include one or more services 511, 521 (i.e., the hardware and/or software required to implement a service, such as a printer service, audio service, music playback service, and the like) in communication with other services within the device and other devices in the SOA environment via the external communication interface 540. In addition, like the device 300 of FIG. 3, the device 500 of this embodiment may also include indication hardware 530 configured to provide the perceivable physical indication upon command. This indication hardware 530 may include, for example, a light emitting device (LED), beeper, buzzer or other sound making device, a speaker, or any combination thereof.

In this embodiment, the device 500 may also include an Identification Service 550, or an application operating on the device 500 that is configured to have knowledge of all or some of the service instances running on the device on which the Identification Service 530 is executed and to control the indication hardware 530. Unlike the previous embodiment discussed in relation to FIGS. 3, 4A and 4B, in which the indication hardware was controlled by signals transmitted from a NoTA resource manager on the service or transport layer using the H_IN protocol, control of the indication hardware 530 in this embodiment may be based on signals transmitted on the application layer to the Indication Service 550. As with the previous embodiment, however, no modifications or involvement is needed of the actual services themselves operating on the device. In other words, according to both embodiments discussed, the services themselves need not be aware of the request to physically identify the device on which they are executed.

Figure 6:
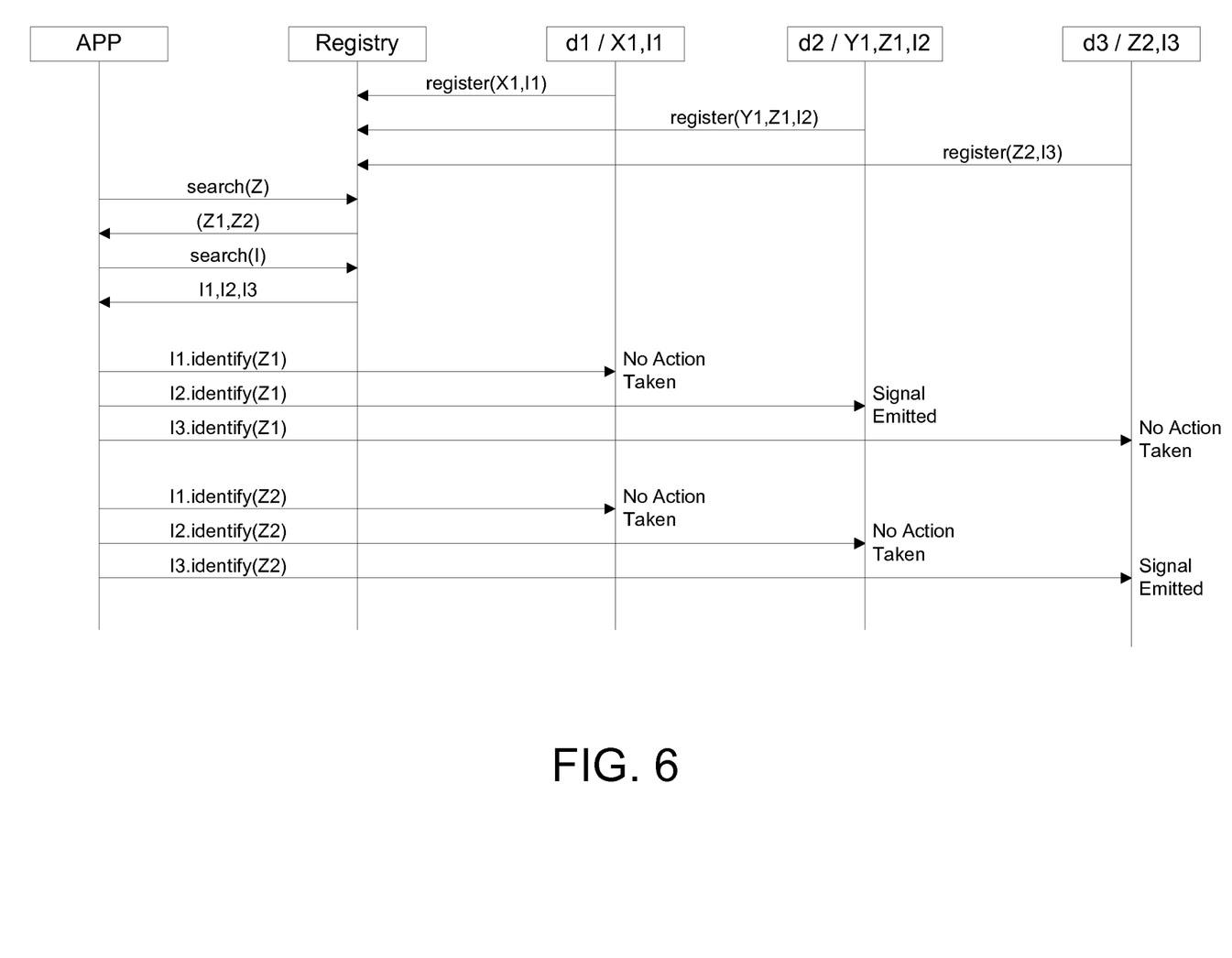
FIG. 6 illustrates the process that may be taken in order to cause a device, such as that shown in FIG. 5, to emit a perceivable physical indication in accordance with another embodiment of the present invention.

Referring now to FIG. 6, as in the previous embodiment, in the embodiment shown in FIG. 6, three devices d1, d2, and d3 implementing three services X, Y and Z are included within the SOA environment. The first device d1 provides a first instance or implementation of service X (i.e., X1). The second device d2 provides a first instance of services Y and Z (i.e., Y1, Z1), while the third device d3 provides a second instance of service Z (i.e., Z2). An application (APP) executed on an unspecified device, such as a mobile phone operated by a user entering the vicinity of the SOA environment (e.g., to send a message using a keyboard and display monitor provided in a visited office), desires to identify devices within the SOA environment that provide an instance of service Z (e.g., a keyboard service).

As shown, the process may begin when each device or service instance or implementation on that device registers itself with the registry (or resource manager). As shown, not only do the instances of the services X, Y and Z register themselves with the registry, but the identification services executed on each device (denoted I1, I2 and I3) will likewise register themselves along with any necessary metadata with the SOA system's resource manager or registry. According to one embodiment, each device includes one identification service, which, as noted above, has knowledge of all or some of the service instances running on the corresponding device and be able to control the device's indication hardware.

At this point the application may query the SOA registry for instances of service Z within the SOA by transmitting the signal search(Z). In response, the registry and, more specifically, a processor or other means operating on one of the devices of the SOA environment providing registry functionality, may provide a list of the instances of service Z included in the SOA, or Z1 and Z2. As in the embodiment discussed above, in one embodiment, not shown, the list provided to the application may also include the devices on which the service instances or implementations are running. This is discussed in more detail below. In the embodiment shown in FIG. 6, however, the registry may provide only the list of service instances or implementations. The application may then query the registry for all or some of the available identification services (e.g., by transmitting the signal search(I)), in response to which the application may receive a list including I1, I2 and I3, corresponding to devices d1, d2, and d3, respectively.

Because the application does not know on which of the three devices the instances of service Z is executed, according to one embodiment, the application may transmit a request to the identification service of each of the devices asking that they provide a perceivable physical indication if they provide either instance of service Z (i.e., Z1 or Z2). The application may transmit the signals I1.identify(Z1), I2.identify(Z1) and I3.identify(Z1) to the identification services of devices one, two and three, respectively. In response to which only the identification service of the second device will cause the indication hardware to emit a signal (e.g., flash a light or beep). Similarly, the application may transmit the signals I1.identify(Z2), I2.identify(Z2) and I3.identify(Z2) to the identification services of devices one, two and three, respectively. In response to which only the identification service of the third device will cause the indication hardware to emit a signal.

In another embodiment, not shown, the identification service of each device may provide the registry, or resource manager, with the metadata detailing the service instances running the device. This information may then be communicated to the application querying for instances of a particular service, such that the application may contact only the identification service of those devices executing the requested service, rather than all devices registered. In other words, in the example of FIG. 6, the application may only transmit signals I2.identify(Z1) and I3.identify(Z2), since only devices d2 and d3 provide an instance of service Z.

To summarize, according to the above embodiment, the service implementations X1, Y1, Z1, Z2, I1, I2, and I3 may register themselves to the service registry. The application (APP) (i.e., a program executed by a device operated by a user entering the SOA and desiring to use one or more device within the SOA to operate a service) may query the service registry for implementations providing service Z. The registry may respond with a list of service implementations and, in one embodiment, the devices on which the service implementations or instances are running. The application may then query the service registry for available identification services, and receive a list of all or some of the available identification services. The application first wants to identify the device running Z1. As a result, the application may send an identify ( ) message to I1, I2 and I3. In response, I2 may give out the identification signal (i.e., instruct the indication hardware to emit a physical indication), as it is the only device on which Z1 is running. The other identification services may discard the message. The service implementation Z1 may then be selected, or a similar procedure may be performed for Z2. At the conclusion, the application may start using the selected service implementation.

CONCLUSION

As described above and as will be appreciated by one skilled in the art, embodiments of the present invention may be configured as an apparatus or method. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
   at least one processor; and
   at least one memory including computer program code, the at least one memory and the computer program code configured to, with the at least one processor, cause the apparatus to perform at least the following:
   receive a request to physically identify a device providing a service; and
   provide for transmission of an instruction to the device, wherein the instruction causes the device to emit a perceivable physical indication.

2. The apparatus of claim 1, wherein the at least one memory and the computer program code are further configured to, with the at least one processor, cause the apparatus to:
   receive a request to identify one or more instances of the service;
   identify one or more instances of the service requested; and
   provide for transmission of an identification associated with respective instances of the service identified, wherein the request to physically identify a device providing a service comprises a request to physically identify a device on which at least one instance of the service identified is executed.

3. The apparatus of claim 2, wherein providing for transmission of an identification associated with respective instances of the service identified further comprises providing for transmission of a device identification associated with a device on which the corresponding instance of the service identified is executed.

4. The apparatus of claim 2, wherein the at least one memory and the computer program code are further configured to, with the at least one processor, cause the apparatus to:
   determine the device on which at least one instance of the service identified is executed.

5. The apparatus of claim 2, wherein the at least one memory and the computer program code are further configured to, with the at least one processor, cause the apparatus to:
   receive a registration request from an instance of a service; and
   provide for storage of the registration request, such that in order to identify one or more instances of a service requested, the processor is configured to access the stored registration request.

6. The apparatus of claim 1, wherein the perceivable physical indication is selected from a group consisting of a light, a sound, a vibration and a smell.

7. The apparatus of claim 1, wherein the service is selected from a group consisting of a printer service, a display service, an audio service, an image capture service, a music playback service, a networking service and a file storage service.

8. A method implemented via at least one processor executing computer program code stored on at least one memory comprising:
    receiving a request to physically identify a device providing a service; and
    providing for transmission of an instruction to the device, wherein the instruction causes the device to emit a perceivable physical indication.

9. The method of claim 8 further comprising:
    receiving a request to identify one or more instances of the service;
    identifying one or more instances of the service requested; and
    providing for transmission of an identification associated with respective instances of the service identified, wherein the request to physically identify a device providing a service comprises a request to physically identify a device on which at least one instance of the service identified is executed.

10. The method of claim 9, wherein providing for transmission of an identification associated with respective instances of the service identified further comprises providing for transmission of a device identification associated with a device on which the corresponding instance of the service identified is executed.

11. The method of claim 9 further comprising:
    determining the device on which at least one instance of the service identified is executed.

12. The method of claim 9 further comprising:
    receiving a registration request from an instance of a service; and
    providing for storage of the registration request, wherein identifying one or more instances of a service requested further comprises accessing the stored registration request.

13. The method of claim 8, wherein the perceivable physical indication is selected from a group consisting of a light, a sound, a vibration and a smell.

14. The method of claim 8, wherein the service is selected from a group consisting of a printer service, a display service, an audio service, an image capture service, a music playback service, a networking service and a file storage service.

15. A computer program ,product comprising at least one tangible computer-readable storage medium having computer-readable program code portions stored therein, said computer-readable program code portions comprising:
    a first executable portion for receiving a request to physically identify a device providing a service; and
    a second executable portion for providing for transmission of an instruction to the device, wherein the instruction causes the device to emit a perceivable physical indication.

16. The computer program product of claim 15, wherein the computer-readable program code portions further comprise:
    a third executable portion for receiving a request to identify one or more instances of the service;
    a fourth executable portion for identifying one or more instances of the service requested; and
    a fifth executable portion for providing for transmission of an identification associated with respective instances of the service identified, wherein the request to physically identify a device providing a service comprises a request to physically identify a device on which at least one instance of the service identified is executed.

17. The computer program product of claim 16, wherein the fifth executable portion is configured to provide for transmission of device identification associated with a device on which the corresponding instance of the service identified is executed.

18. The computer program product of claim 16, wherein the computer-readable program code portions further comprise:
    a sixth executable portion for determining the device on which at least one instance of the service identified is executed.

19. The computer program product of claim 16, wherein the computer-readable program code portions further comprise:
    a sixth executable portion for receiving a registration request from an instance of a service; and
    a seventh executable portion for providing for storage of the registration request, such that in order to identify one or more instances of a service requested, the fourth executable portion is configured to access the stored registration request.

20. The computer program product of claim 15, wherein the perceivable physical indication is selected from a group consisting of a light, a sound, a vibration and a smell.

21. The computer program product of claim 15, wherein the service is selected from a group printer service, a display service, an audio service, an image capture service, a music playback service, a networking service and a file storage service.

22. An apparatus comprising:
    means for receiving a request to physically identify a device providing a service; and
    means including at least one processor for providing for transmission of an instruction to the device, wherein the instruction causes the device to emit a perceivable physical indication.

23. The apparatus of claim 22 further comprising:
    means for receiving a request to identify one or more instances of the service;
    means for identifying one or more instances of the service requested; and
    means for providing for transmission of an identification associated with respective instances of the service identified, wherein the request to physically identify a device providing a service comprises a request to physically identify a device on which at least one instance of the service identified is executed.

24. The apparatus claim 23, wherein the means for providing for transmission of an identification associated with respective instances of the service identified further comprises means for providing for transmission of a device identification associated with a device on which the corresponding instance of the service identified is executed.

25. The apparatus of claim 23 further comprising:
    means for determining the device on which at least one instance of the service identified is executed.

26. The apparatus of claim 23 further comprising:
    means for receiving a registration request from an instance of a service; and
    means for providing for storage of the registration request, such that in order to identify one or more instances of a service requested, the apparatus is configured to access the stored registration request.

27. An apparatus comprising:
    at least one processor; and
    at least one memory including computer program code, the at least one memory and the computer program code configured to, with the at least one processor, cause the apparatus to perform at least the following:

provide for transmission of a request to identify one or more instances of a service;

receive an identification associated with respective instances of the service identified; and provide for transmission of a request to physically identify a device on which at least one instance of the service identified is executed, such that in response to the request the device emits a perceivable physical indication.

28. The apparatus of claim 27, wherein the perceivable physical indication is selected from a group consisting of a light, a sound, a vibration and a smell.

29. The apparatus of claim 27, wherein the identification associated with respective instances received comprises a device identification associated with a device on which the corresponding instance of the service identified is executed.

30. A method implemented via at least one processor executing computer program code stored on at least one memory comprising:

providing for transmission of a request to identify one or more instances of a service;

receiving an identification associated with respective instances of the service identified; and providing for transmission of a request to physically identify a device on which at least one instance of the service identified is executed, such that in response to the request the device emits a perceivable physical indication.

31. The method of claim 30, wherein the perceivable physical indication is selected from a group consisting of a light, a sound, a vibration and a smell.

32. The method of claim 30, wherein the identification associated with respective instances received comprises a device identification associated with a device on which the corresponding instance of the service identified is executed.

33. A computer program product comprising at least one tangible computer-readable storage medium having computer-readable program code portions stored therein, said computer-readable program code portions comprising:

a first executable portion for providing for transmission of a request to identify one or more instances of a service;

a second executable portion for receiving an identification associated with respective instances of the service identified; and a third executable portion for providing for transmission of a request to physically identify a device on which at least one instance of the service identified is executed, such that in response to the request the device emits a perceivable physical indication.

34. The computer program product of claim 33, wherein the perceivable physical indication is selected from a group consisting of a light, a sound, a vibration and a smell.

35. The computer program product of claim 33, wherein the identification associated with respective instances received comprises a device identification associated with a device on which the corresponding instance of the service identified is executed.

36. An apparatus comprising:

means for providing for transmission of a request to identify one or more instances of a service;

means for receiving an identification associated with respective instances of the service identified; and means including at least one processor for providing for transmission of a request to physically identify a device on which at least one instance of the service identified is executed, such that in response to the request the device emits a perceivable physical indication.

* * * * *

UNITED STATES PATENT AND TRADEMARK OFFICE
CERTIFICATE OF CORRECTION

PATENT NO. : 8,106,761 B2  Page 1 of 1
APPLICATION NO. : 11/782241
DATED : January 31, 2012
INVENTOR(S) : Luukkala et al.

It is certified that error appears in the above-identified patent and that said Letters Patent is hereby corrected as shown below:

Column 8
Line 62, "(or Wi-FiR)" should read --(or Wi-Fi®)--.

Signed and Sealed this
Thirteenth Day of November, 2012

David J. Kappos
*Director of the United States Patent and Trademark Office*